| United States Patent [19] | [11] 4,164,489 |
| --- | --- |
| Daniels et al. | [45] Aug. 14, 1979 |

[54] CONTINUOUS EMULSION POLYMERIZATION OF VINYL ACETATE AND ETHYLENE

[75] Inventors: Wiley E. Daniels, Easton, Pa.; William E. Lenney, Middlesex, N.J.

[73] Assignee: Air Products and Chemicals, Inc., Allentown, Pa.

[21] Appl. No.: 899,421

[22] Filed: Apr. 24, 1978

[51] Int. Cl.² .................. C08F 210/02; C08L 23/04
[52] U.S. Cl. .................. 260/29.6 R; 526/65; 526/331
[58] Field of Search .................. 526/65, 331; 260/29.6 R

[56] References Cited

U.S. PATENT DOCUMENTS

| 2,200,429 | 5/1940 | Perrin et al. | 260/80 |
| 2,703,794 | 3/1955 | Roedel | 260/87.3 |
| 3,325,460 | 6/1967 | Schellenberg et al. | 526/65 |
| 3,534,009 | 10/1970 | Beresniewicz | 526/331 |
| 3,708,388 | 1/1973 | Lindemann et al. | 260/29.6 B |
| 4,035,329 | 7/1977 | Wiest et al. | 260/29.6 T |

FOREIGN PATENT DOCUMENTS 991550  5/1965  United Kingdom.

*Primary Examiner*—Harry Wong, Jr.
*Attorney, Agent, or Firm*—Russell L. Brewer; E. Eugene Innis; Barry Moyerman

[57] ABSTRACT

This invention relates to an improved continuous process for producing vinyl acetate-ethylene copolymer emulsions. The improvement for continuous polymerization of vinyl acetate and ethylene comprises continuously charging a reaction mixture containing vinyl acetate and ethylene to a polymerization vessel, conducting an initial polymerization of the vinyl acetate and ethylene in the presence of a seed latex under ethylene pressure and continuously removing the thus formed latex from the initial polymerization vessel at an unreacted vinyl acetate monomer content from 5–20% by weight of the latex and then effecting a post polymerization of the unreacted vinyl acetate at an ethylene pressure of not more than about 300 psia until the unreacted vinyl acetate in the latex is less than 1% by weight.

12 Claims, 4 Drawing Figures

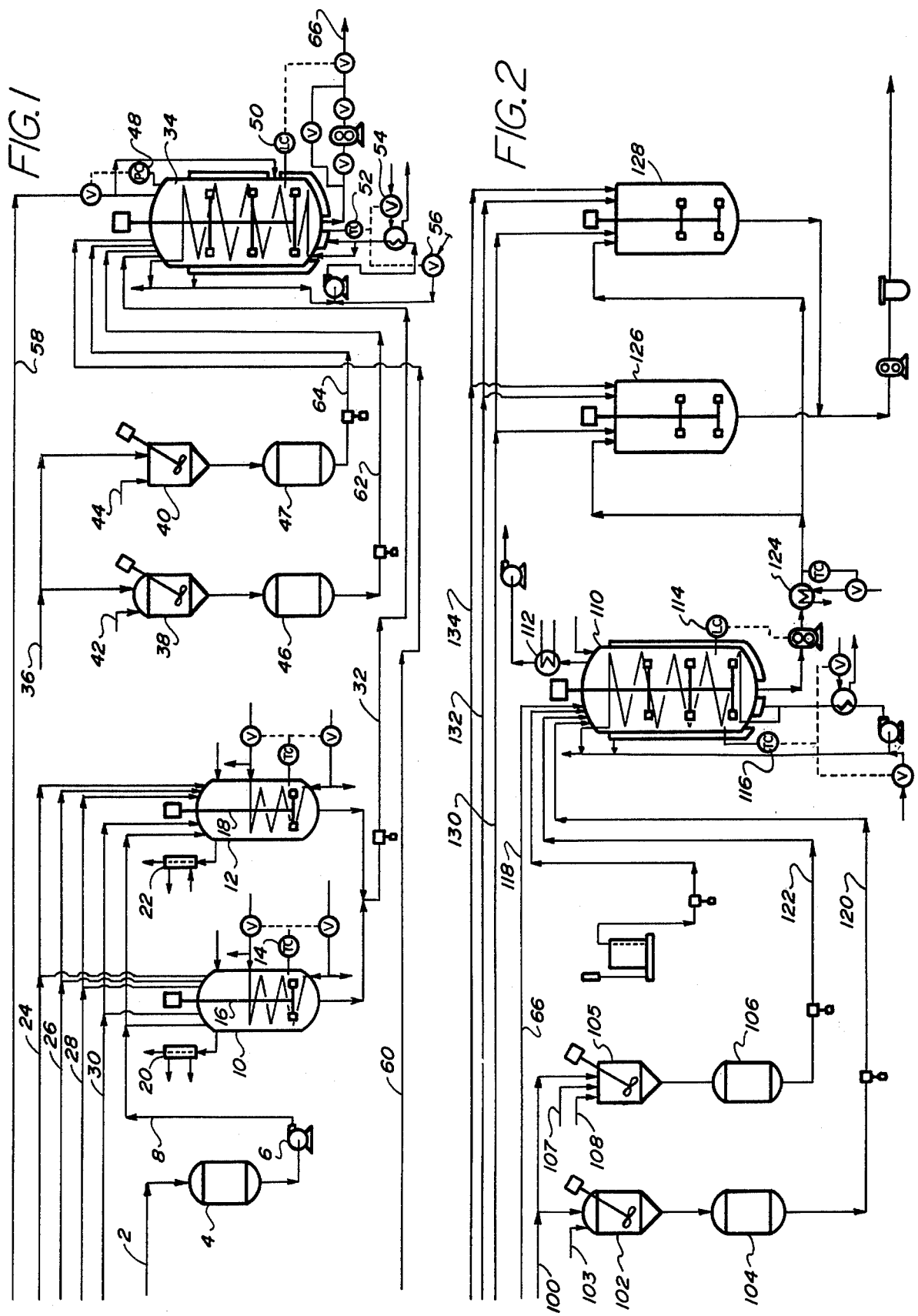

CONTINUOUS EMULSION POLYMERIZATION OF VINYL ACETATE AND ETHYLENE

BACKGROUND OF THE INVENTION

1. Field of the Invention

This invention relates to a continuous process for producing a vinyl acetate-ethylene copolymer emulsion.

2. Description of the Prior Art

The earliest work in preparing vinyl acetate-ethylene emulsions, which are suited as adhesive compositions for rug backing applications, woven and nonwoven goods, and impregnating applications, seems to have been done by Perrin in U.S. Pat. No. 2,200,429. The earliest work generally resulted in low ethylene concentrations, e.g., 2-5% by weight.

Roedel in U.S. Pat. No. 2,703,794, described a continuous process for producing vinyl acetate-ethylene emulsions by carrying out the polymerization in the presence of tertiary butyl alcohol, an emulsifying agent and a redox catalyst system comprising a peroxygen compound and a reducing agent. Essentially, the process comprised a batch reaction with continuous addition and withdrawal of the polymer recipe from the reactor. Some of the difficulties in this processes were substantial wall fouling and latex irregularities in terms of copolymer particle size.

In British Pat. No. 991,550, a batch polymerization process is described in which vinyl acetate-ethylene copolymers could be produced having an ethylene concentration of 10-15% by weight. In that process, vinyl acetate was continuously introduced to the reactor while maintaining an ethylene pressure of about 20 atmospheres. A surface active agent and protective colloid were included to enhance product stability and polymerization was effected using a redox catalyst system.

U.S. Pat. No. 3,708,388 discloses a batch process for producing vinyl acetate-ethylene copolymer emulsions having superior adhesion to other vinyl acetate-ethylene copolymer emulsions and having higher ethylene content. It was noted that the earlier continuous processes were difficult to operate and achieve uniform ethylene concentration and consistent particle size. In the U.S. Pat. No. 3,708,388, it was disclosed that higher ethylene concentrations could be achieved by polymerizing the vinyl acetate and ethylene in the presence of a protective colloid, however, the adhesive quality of the emulsion was increased by permitting an equilibrium to be achieved between the vinyl acetate and ethylene prior to initiating polymerization. It was also reported that when using polyvinyl alcohol protective colloid greater adhesive quality was achieved.

U.S. Pat. No. 4,035,329 discloses a process for the continuous production of an ethylene-vinyl acetate copolymer dispersion. As noted in that patent, the Roedel U.S. Pat. No. 2,703,794 process does not proceed at a satisfactory speed or in a uniform manner. To overcome some of the disadvantages in prior art continuous processes, the patent notes that the polymerization should be effected in the presence of an emulsifier and/or protective colloid, a free radical water soluble redox catalyst system comprising a reducing agent and oxidizing agent with the molar ratio of reducing agent to oxidizing agent being at least 3:1. In addition, the monomers should be added to the polymerization zone at a rate such that the concentration of unreacted monomers does not exceed 15% by weight of the total weight of the reaction mixture. By employing this particular technique, it is reported that wall fouling is reduced and polymerization is carried out at a satisfactory commercial rate.

SUMMARY OF THE INVENTION

This invention relates to an improvement in a process for the continuous polymerization of vinyl acetate and ethylene to form emulsions or latices. Basically in the process, a reaction mixture comprising vinyl acetate, ethylene, water, a free radical initiator, and a protective colloid is charged to a polymerization zone and polymerized under ethylene pressure to form a latex containing a vinyl acetate-ethylene copolymer. The improvement for effecting continuous polymerization, and constituting the basis of this invention comprises:

(a) continuously charging said reaction mixture to a polymerization vessel;

(b) conducting an initial polymerization of the reaction mixture in said polymerization vessel in the presence of a seed latex and under a sufficient ethylene pressure for a time and sufficient temperature to form a copolymer having a glass transition temperature (Tg) from about −20° to 10° C.; and (c) continuously removing the thus formed copolymer latex from the polymerization vessel at an unreacted vinyl acetate concentration of from about 5-20% by weight of the copolymer latex and effecting a post polymerization of the unreacted vinyl acetate in the copolymer latex at an ethylene pressure of not more than about 300 psia until the unreacted vinyl acetate in the copolymer latex is less than 1% by weight, and preferably less than 0.5%.

Specific advantages obtained by the process include:

a latex composition which has a vinyl acetate-ethylene copolymer therein which provides for desirable adhesion to various substrates which in many cases often exceeds those adhesive qualities for vinyl acetate-ethylene copolymers obtained in batch polymerization processes;

a latex which contains a copolymer having acceptable creep resistance;

an advantage of using an efficient continuous process as opposed to a time consuming batch process in producing a vinyl acetate-ethylene dispersion;

an ability to minimize wall fouling in the polymerization reactors thereby permitting increased productivity in the reaction system; and an ability to form a latex with substantially uniform properties primarily because of consistent particle size and ethylene concentration in the product.

THE DRAWINGS

FIG. 1 is a process flow diagram for the feed premix and primary reactor section where the initial polymerization of vinyl acetate-ethylene is effected.

FIG. 2 is a process flow diagram of the auxiliary feed components and secondary polymerization reactor with accompanying post treatment units.

DESCRIPTION OF THE PREFERRED EMBODIMENTS

Figure 4:
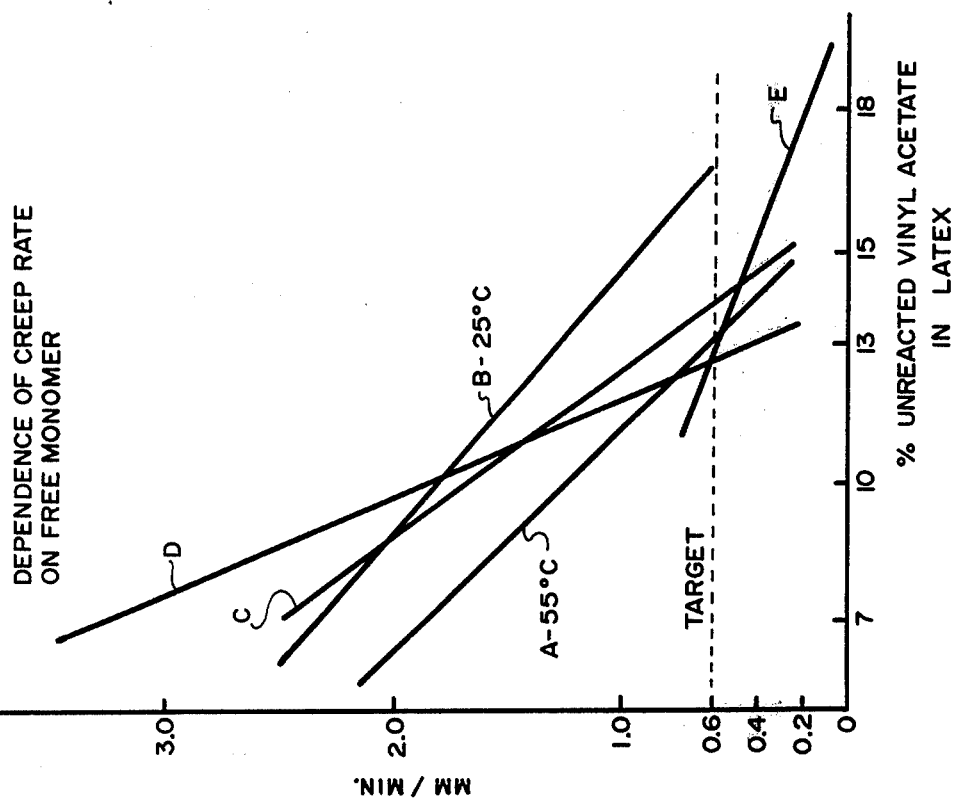
FIG. 4 is a graph of creep rate of the final product from the post polymerization zone in millimeters per minute verses the percent unreacted vinyl acetate in the latex from the initial polymerization zone and as a function of the temperature of the initial and post-polymerization reaction zones.

The reaction mixture, (sometimes referred to as a polymerization recipe) suited for forming the vinyl acetate-ethylene emulsions is substantially identical to those reaction mixtures utilized heretofore in forming vinyl acetate-ethylene copolymers and terpolymers. Basically, these reaction mixtures comprise water, which is added in sufficient amount to provide a latex having a solids content of from about 40 to 65%, but generally in the range of from 50 to 60% by weight, a free radical initiator, a protective colloid and/or emulsifiers and buffers, vinyl acetate, ethylene, and optionally from 0–10% of another vinyl monomer.

More particularly in the reaction mixture, the free radical initiators used to initiate the polymerization are those which comprise a reducing agent and an oxidizing agent. The combination often is referred to as a redox polymerization catalyst. Typical reducing agents, which are referred to as activators, include bisulfites, sulfoxylates, or compounds having reducing properties such as ferrous salts, and tertiary aromatic amines. Specific examples of the reducing agents include sodium and zinc formaldehyde sulfoxylate, ferrous ammonium sulfate, sodium metabisulfite, sodium bisulfite, ferrous sulfate, dimethylaniline. Typical oxidizing agents include peresters, peroxydicarbonates, persulfates, perborates and peroxides such as hydrogen peroxide, t-butyl-hydroperoxide, benzoyl peroxide, potassium persulfate, ammonium persulfate, and the like. It is known that the more water soluble reducing agents and peroxides are preferred in effecting polymerization of the monomers.

The free radical initiator is employed in the polymerization reaction in an amount to provide from 0.05%–2% oxidizing agent by weight of the vinyl acetate. In contrast to prior art processes where all of the initiator is added to the polymerization vessel, only a small fraction, e.g., 2 to 10% of the total amount of initiator is generally used in the initial polymerization zone and the rest is employed in the post polymerization zone. This division is required since a specific unreacted vinyl acetate monomer content is desired in the initial polymerization zone. If the initiator level were too high, the unreacted vinyl acetate monomer in the latex would be too low and if the initiator level were too low the unreacted vinyl acetate would be too high. Thus, the percent unreacted vinyl acetate monomer level governs the level of initiator addition to the initial polymerization zone.

The mole ratio of reducing agent is maintained at about 0.5–1.6 moles per mole of oxidizing agent in the initial polymerization zone and from about 0.15 to 1 moles per mole oxidizing agent in the post-polymerization zone. If too little reducing agent is used in the initial polymerization, then the reaction slows and the unreacted vinyl acetate content may rise. An excess of reducing agent, e.g., greater than 1:1 is of no significance since it will be carried over into the post-polymerization zone. When the mole ratio of reducing agent falls below about 0.2 moles per mole oxidizing agent, in the post polymerization zone then like the initial polymerization zone the rate slows. On the other hand, we have found that a mole ratio in excess of about 0.6 moles per mole oxidizing agent tends to retard the reaction rather than accelerate the reaction. Therefore, a level of 0.2–0.6 moles reducing agent per mole oxidizing agent is preferred. But, higher levels of reducing agent can be tolerated without interfering with product performance.

Emulsifying agents or surfactants are generally included in the reaction mixture to improve product stability. Nonionic surfactants are conventionally used in forming the emulsions and examples include polyoxyethylene condensates such as polyoxyethylene aliphatic ethers, e.g., polyoxyethylene lauryl ether, polyoxyethylene oleyl ether, polyoxyethylene nonylphenyl ether, polyoxyethylene octylphenyl ether; polyoxyethylene esters of fatty acids, e.g., polyoxyethylene laurate, polyoxyethylene oleate and polyoxyethylene amides such as N-polyoxyethylene lauramide and the like. Specific examples of nonionic surfactants are marketed under the trademark IGEPAL such as IGEPAL CO-630, which is a polyoxyethylene nonylphenyl ether having a cloud point of from 126°–133° F., and IGEPAL CO-610, which is a polyoxyethylene nonylphenyl ether having a cloud point of about 86° F. Another class of nonionic surfactants commonly used in the reaction mixture are alkylene oxide adducts of acetylenic glycols and under the trademark "SURFYNOL" by Air Products and Chemicals, Inc. An example of a SURFYNOL emulsifier is an ethylene oxide adduct of 2, 4, 7, 9-tetramethyl decynediol containing an average of 10–30 moles ethylene oxide per mole of diol.

The emulsifying agent normally is included in the reaction mixture in an amount from about 0.5 to 5% based on the aqueous phase of latex regardless of the solids content. Generally, the level of emulsifying agent is from about 2–3%. Latex stabilizers can also be added to stabilize the emulsion and these include acids such as sodium vinyl sulfonate, itaconic acid, maleic acid and the like which polymerize into the system.

Protective colloids are used in conjunction with the emulsifying agents or by themselves for stabilizing the reaction mixture during polymerization. Examples of protective colloids conventionally used include cellulose ethers such as carboxymethyl cellulose, hydroxyethyl cellulose, polyvinyl alcohol, and others conventionally used. Of these, polyvinyl alcohol is the preferred protective colloid as it appears to enhance the adhesive quality of the resulting copolymer. Protective colloids are added to the reaction mixture in a proportion of from 0.5–5% preferably 2–3% by weight.

Latex stability is directly related to pH, and in this regard, the pH is maintained at about 3–6.5, and preferably 4.5–6. The pH is effectively controlled by the use of buffers, e.g., sodium acetate, sodium phosphate, ammonium and sodium bicarbonate, phosphoric acid, etc.

Optionally, other monomers can be included in the reaction mixture to effect cross-linking of the vinyl acetate-ethylene latices. The monomer cross-linking agents can be either of the immediately-reactive type, or of the post-reactive type. Examples of the former are vinyl esters of polybasic acids, such as divinyl adipate, and divinyl succinate, divinyl ether, diallyl ether, allyl esters of polyfunctional acids, such as triallyl cyanurate, diallyl fumarate, triallyl citrate, and diallyl maleate, and other di- or tri-allyl compounds such as diallyl melamine. Examples of cross-linking agents of the post-reactive type are glycidyl compounds such as allyl glycidyl ether, glycidyl acrylate, glycidyl methacrylate, glycidyl vinyl ether, and the like, N-methylol compounds, such as N-methylol acrylamide, N-methylol methacrylamide, and their alkyl ethers, e.g., their methyl or butyl ethers.

The cross-linking agents can either be added to the initial charge or they can be added incrementally during the polymerization reaction, depending upon the desired distribution in the polymer, as known in the art. The quantity of the immediately reactive type of cross-linking agent used is generally 0.01 to 1 percent by weight of the vinyl acetate, depending upon the specific mechanical properties desired, e.g., the hardness and solvent swelling characteristics.

Monomers not of the cross-linking type, but which can be interpolymerized with vinyl acetate and ethylene include wet adhesion monomers, e.g. acrylic and allylic unsaturated ureido compounds which can impart wet adhesion to the copolymer for use in paint formulations. Other monomers copolymerizable with vinyl acetate and vinyl acetate/ethylene are, e.g., butyl acrylate, vinyl ether, 2-ethylhexyl acrylate, vinyl chloride and the like. Such monomers often are included in a proportion of from 0–5% by weight of the total monomers charged to impart their desired effect to the product.

In contrast to the reaction mixtures used in the prior art, it has been found that the use of a seed latex in the continuous polymerization process enhances product uniformity and stability. In polymerization runs without a seed latex, it has been found that there is substantial wall fouling during the initial polymerization and there is particle size cycling. We believe the seed latex provides polymerization sites for vinyl acetate and ethylene, and as a result, the particles can grow on the seed rather than the reactor walls and internals, e.g., agitator. The seed latex can be any conventional latex which is compatible with the vinyl acetate-ethylene dispersion and may include emulsifiers, surfactants, protective colloid, and so forth. The seed should have a particle size of from about 0.1–0.5 microns, preferably about 0.15–0.25 microns. Larger size seed particles tend to result in excessively large vinyl acetate-ethylene copolymer particles and may cause the emulsion to become unstable. Smaller size particles tend to result in product which is too small. The seed latex is included in a proportion to provide from about 2 to 8% by weight seed latex solids, which includes copolymer, emulsifier, and other additives, by weight of the vinyl acetate in the reaction mixture. In a preferred embodiment, the level of seed polymer solids is from about 4 to 6% by weight of the vinyl acetate.

Examples of seed latices which can be used include a vinyl acetate homopolymer which has an average particle size of about 0.2 microns and is stabilized with nonionic surfactants; a vinyl acetate-ethylene emulsion having an average particle size of about 0.2, micron and vinyl acetate-lower alkyl acrylates such as vinyl acetate-butyl acrylate emulsions having a particle size of about 0.2–0.3 microns. Where copolymers or terpolymers are used, the vinyl acetate content generally is from about 85 to 95% by weight. Additionally, an all acrylic latex having the appropriate particle size or vinyl chloride and vinyl chloride-ethylene copolymers and interpolymers can be used.

Polymerization control in the continuous operation differs from the batch method. During the initial polymerization, polymerization is allowed to proceed until a copolymer product is produced having a desirable glass transition temperature within the range of from −20° to 10° C., and preferably within the range of −14° to 4° C. Normally, ethylene is charged to the vessel to an ethylene pressure of from about 250 psia to 1200 psia, and preferably to about 700–1000 psia. The temperature and residence time the ethylene pressure is adjusted within the above range to give the desired product Tg. A broad temperature range is from 0°–80° C., and a broad residence time is from about 2–10 hours. Generally, the initial polymerization is done at a temperature of about 40°–75° C., and the residence time is from about 2.5–5 hours.

Latex is removed from the initial polymerization zone when (a) the copolymer has the desired Tg for the product produced, and (b) the unreacted vinyl acetate concentration is from about 5–20% by weight of the latex. When the unreacted vinyl acetate is allowed to fall below about 5%, and in preferred cases below about 12% by weight, the peel strength of the product falls of dramatically (see FIG. 3) and the creep rate increases (see FIG. 4). When the unreacted vinyl acetate is permitted to rise to levels above 20% by weight preferably 16% and then sent to the post-polymerization zone, the physical properties of the product in terms of peel strength are poor.

The post-polymerization of the vinyl acetate in the copolymer emulsion from the initial polymerization is quite simple. In the post-polymerization zone, which is usually completed in one polymerization vessel, the unreacted vinyl acetate is polymerized to a level of 1%, and preferably below 0.6% by weight. To avoid forming substantial quantities of additional copolymer, the ethylene pressure is reduced and should not exceed about 300 psia, and preferably 30 psia. Normally, to minimize copolymer cormation the ethylene is flashed and the post polymerization is operated at atmospheric pressure. To effect polymerization of the vinyl acetate, the polymerization temperature is maintained at about 25°–80° C., and preferably about 45°–55° C. When lower temperatures, e.g., 25° C. are employed, the peel strength of the product is reduced as compared to the product produced at higher temperatures. However, peel strengths are good over the broad temperature range. Post-polymerization usually takes about 2–8 hours, and generally 2.5–5 hours.

We believe the explanation regarding the effect of the unreacted vinyl acetate in the initial polymerization zone on peel strength and other physical properties is that two types of polymer products are being formed by the two stage polymerization. In the initial polymerization, a vinyl acetate-ethylene copolymer is formed and in the post polymerization vinyl acetate is grafted onto the copolymer and to a lesser extent onto the protective colloid. The latter case would occur where the protective colloid contained an abstractable hydrogen atom such as in polyvinyl alcohol. When the vinyl acetate falls below 5% in the initial polymerization preferably 12%, there is an insufficient amount of the graft polymer present to give desired creep strength and when the vinyl acetate is at a level above 20%, preferably 16%, there is insufficient copolymer to give the desired peel strength. This is mainly why two conditions are imposed in the initial polymerization zone, i.e., to polymerize to a desired Tg and to a specific vinyl acetate monomer content.

By referring to FIGS. 1 and 2, which show the process flow scheme for a commercial continuous polymerization operation, the mechanism by which a vinyl acetate-ethylene copolymer emulsion can be produced on a continuous basis will be better understood. In referring to FIG. 1 which pertains to the initial polymerization section, a premix, exclusive, of monomer, is formed by first charging a seed latex through line 2 to holding tank 4. After formation of a protective colloid solution (to be described) it is pumped via pump 6 through line 8 to one of two mixing tanks 10 and 12.

Mixing tanks 10 and 12 are used to prepare the protective colloid solution and are equipped with coils to permit temperature control via temperature sensor 14. These vessels are also equipped with agitators 16 and 18, respectively, as well as condensers 20 and 22 to eliminate water loss to the atmosphere. In forming the protective colloids solution distilled water is charged through line 24 to mixing vessels 10 and 12 in an amount required to provide the desired dilution, i.e., solids content of the emulsion. Then, polyvinyl alcohol or other protective colloid is charged through line 26, and dissolved at about 80° C. After it is dissolved, the solution is cooled and then the seed from holding tank 4, a reducing salt, e.g., ferrous ammonium sulfate through line 28 and pH buffer, e.g., phosphoric acid through line 30 are added to the mixing vessels. The contents are uniformly blended at a temperature generally from about 80°–120° F. for a period of 30 minutes. The premix is continuously withdrawn through line 32 for introduction to the primary reactor 34.

In separate mixing vessels, the free radical initiator is prepared. The oxidizing agent is formed by first charging distilled water through line 36 to mixing vessel 38, and then hydrogen peroxide or other peroxy compound is added through line 42 to tank 38 to provide the desired amount of oxidation component for the initiator system. The reducing agent, in this case, sodium formaldehyde sulfoxylate (SFS), is charged through line 44 to tank 40 and mixed with water supplied from line 36. After the oxidizing and reducing components are prepared, they are dropped into holding tanks 46 and 47 and new batches prepared.

The initial polymerization is carried out in primary reactor 34 which is a stainless steel reactor equipped with coils and agitation means. In the present unit, three turbine agitation means are provided. In addition, the initial polymerization vessel is equipped with a pressure controller 48 which is utilized to maintain desired ethylene pressure in the polymerization reactor. A liquid level controller 50 is used to maintain the degree of heel or liquid volume in the reactor. The liquid level can be adjusted at various depths within the reactor to provide for desired cooling and agitation. Temperature controller 52 has the capability of adjusting steam or water flow through valves 54 or 56, respectively, to the coils to maintain the appropriate temperature level.

In carrying out the initial polymerization in reactor 34, a heel, which is either product or other emulsion, is added to reactor 34 to provide heat transfer and an agitation medium for the reaction mixture. Of course in a preferred mode, the heel is a vinyl acetate-ethylene emulsion, preferably the same composition as the end product, so that there will be little contamination. After a heel of from 70 to 90% of the volume of the reactor is charged to reactor 34, ethylene is added through line 58 to provide the desired ethylene pressure therein which is maintained by pressure controller 48. As previously indicated, the ethylene pressure may vary from about 250 psia to 1200 psia with preferred pressures being from about 700 to 1000 psia to produce an end polymer having a desired copolymer glass transition temperature ($T_g$). If the ethylene is sparged into the reactor or there is vigorous agitation, the ethylene pressure may be reduced by about 10–20%.

After having pressurized the primary reactor 34, vinyl acetate is added through line 60 on a continuous basis and in combination with the polymer premix through line 32, the oxidizing component through line 62, and reducing agent through line 64. Although not shown, the vinyl acetate and optional monomers may be charged with the seed and polyvinyl alcohol premix. Some of the vinyl acetate, up to about 20% of the total vinyl acetate by weight, may be directed to the secondary reactor if desired. In that case, the percent unreacted vinyl acetate content in the latex from the initial polymerization is calculated based on the actual vinyl acetate in the latex from the initial polymerization plus the quantity of vinyl acetate added to the secondary reactor. Polymerization is carried out at a temperature generally from 40°–75° C. until the latex, as obtained through line 66 at the bottom of primary reactor 34, has a $T_g$ of from −20° to 10° C. and an unreacted vinyl acetate content of from about 5 to 20% by weight. (The vinyl acetate analysis is based on the latex which includes surfactant, seed, etc. and the gaseous ethylene content is ignored.) Generally, for vinyl acetate-ethylene emulsions used as an adhesive or rug backing, the $T_g$ is from −14° to 4° C., and the vinyl acetate free monomer concentration in the latex from the primary polymerization reactor is from about 12 to 16%. After the initial polymerization of vinyl acetate and ethylene has been achieved in primary reactor 34, a post-polymerization is effected to reduce the vinyl acetate content in the latex to less than 1% by weight, and preferably less than 0.6%.

Referring to FIG. 2, which pertains to the post-polymerization and recovery zone, a redox initiator system is formulated in the same manner as the redox catalyst system described in FIG. 1 in vessels 38, 40, 44 and 46. More particularly with respect to the oxidizing component, distilled water is charged through line 100 to mixing vessel 102 and then the oxidation component is charged through line 103 and mixed. The product is stored in holding tank 104 and metered continuously to the secondary reactor 110 as required. The reducing component is prepared by charging distilled water through line 100 to vessel 105 and then the reducing agent component is charged through line 107 and buffer through line 108. After formulation, the reducing agent is held in tank 106 and metered continuously to the secondary reactor.

Post-polymerization is carried out in secondary reactor 110 which is similarly equipped to primary reactor 34 in that it has coils to permit temperature control and agitation means including the three turbine agitator. Secondary reactor 110 is also equipped with condenser 112 to reduce the loss of water. The liquid level is maintained by level control element 114 and temperature is controlled by sensor 116, which is used to regulate the flow of steam or cold water to the coils.

As in the initial polymerization zone, the secondary reactor 110 is filled with a heel to a level typically from 70 to 90% by volume with an emulsion, preferably product emulsion. This is done for the same purpose as it was done in the primary reactor. Then, latex from the primary reactor containing the unreacted vinyl acetate is charged through line 66 to secondary reactor 110 and polymerization is continued by adding oxidizing agent 120 and reducing agent 122 in appropriate quantity. In contrast to the polymerization in primary reactor 34, the pressure during polymerization is maintained at less than 300 psia, and generally less than 30 psia. In other words, substantially all of the ethylene is vented through condenser 112 and then to a flare, thus leaving vinyl acetate remaining for post-polymerization. Polymerization is effected until the vinyl acetate content is reduced to less than 1% by weight of the latex, and typically to a quantity less than 0.5% by weight. Temperatures utilized in the secondary reactor to achieve this level of vinyl acetate polymerization are from about 25° to 80° C., but preferably at a range of from 45° to 55° C. Sometimes a defoamer is added to the post-polymerization reactor to reduce foaming caused by the polymerization at reduced pressure and venting of ethylene.

Once the post-polymerization has been effected, the product emulsion can be recovered in conventional manner. In this regard, the product latex from secondary reactor 110 is removed through line 124 and discharged to post-treatment blend tanks 126 and 128 wherein volatiles are removed and post-additions made. In this case, blend tanks 126 and 128 are equipped with agitation means and appropriate amounts of neutralizing agent and stabilizer through line 130, and biocides through line 132 and through line 134 are charged.

The following examples are provided to illustrate preferred embodiments of the invention and are not intended to restrict the scope thereof. All parts are parts by weight, and all percentages are expressed as weight percentages.

EXAMPLE 1

A commercial plant having a process flow diagram as described in FIGS. 1 and 2 for producing a vinyl acetate-ethylene latex having good adhesion and creep resistance is prepared in the following manner. The plant utilizes a 5,400 gallon primary reactor 34 made of 316 stainless steel and a 5,400 gallon secondary reactor 110 of 316 stainless steel, both being equipped with three turbine agitators and having an operating capacity of from 4000–4300 gallons. The values below are calculated on the basis of one hour operation.

In the premix section, 3,288 pounds of a seed emulsion containing 45% water is held in tank 4 at a temperature of about 75° F. The seed polymer is a commercially available vinyl acetate-ethylene copolymer dispersion having a Tg of 2°±2° C., a Brookfield viscosity (Model LVF spindle at 60 RPM and 25° C.), of from 200–500 cps, a pH of 5–5.6, an average particle size of about 0.17 microns, and is stabilized with a nonionic surfactant. In either premix vessels 10 or 12, there is added, in appropriate order, 7.40 pounds of a ferrous ammonium sulfate solution containing 6.75 pounds water; 2,025 pounds of polyvinyl alcohol, containing 75 parts by weight of a polyvinyl alcohol being 87–89% hydrolyzed and having a viscosity of 4–6 cps, sold under the trademark Vinol 205 by Air Products and Chemicals, Inc., and 25 parts by weight of a polyvinyl alcohol being 87–89% hydrolyzed and having a viscosity of 21–25 cps sold under the trademark Vinol 523 by Air Products and Chemicals, Inc.; 15,764 pounds water and 18 pounds of a phosphoric acid solution containing 13.5 pounds phosphoric acid and 4.5 pounds water. After blending to form the polyvinyl alcohol solution, the seed is charged from tank 4 and the contents are blended at a temperature of 100° F. to form a polyvinyl alcohol-seed mix.

The free radical initiator system is prepared by first forming 518 pounds of an oxidizing component consisting of 0.03% hydrogen peroxide solution in water in vessels 38 or 40. In vessels 44 or 46, 364 pounds of reducing agent or activator is prepared by mixing sodium formaldehyde sulfoxylate and water to form a 0.5% solution.

Prior to commencing polymerization, primary reactor 34 is filled with 38,000 pounds (about 80% capacity by volume) of a vinyl acetate-ethylene emulsion having a solids content of 55% a Tg of 0°±2° C. and stabilized with a partially acetylated polyvinyl alcohol. This addition provides for a heel. The reactor is pressurized to a pressure of 925 psig and heated to a temperature of 118° F. Then, the polyvinyl alcohol-seed mix from vessels 10 or 12 at 90° F. is pumped at a rate of 487 gallons per hour to the primary reactor. The oxidizing component of the redox catalyst is pumped at a rate of 62 gallons per hour and the activator at 43 gallons per hour to provide a mole ratio of reducing agent to oxidizing agent of about 1.57:1 and an initiator level of 0.005% by weight of the vinyl acetate. Vinyl acetate is charged to the primary reactor at a rate of 5,188 pounds per hour. At this rate of continuous addition of vinyl acetate, premix and redox catalyst to the primary reactor, the ethylene consumption is about 668 pounds per hour.

Polymerization is effected at a temperature of about 122° F. (50° C.) at 925 psig, and an unfinished emulsion is removed at a rate of 1,291 gallons (11,186 pounds) per hour. The composition of the unfinished emulsion from the primary reactor contains approximately 4465 pounds water, 1672 pounds vinyl acetate, 452 pounds ethylene with a total polymer solids of 4596 pounds. The $T_g$ of the copolymer is 0°±2° C. and the percent unreacted vinyl acetate in the latex composition is about 14.95%. (A target of about 14–15% vinyl acetate by weight in the latex is used).

After initial polymerization in the primary reactor, the post-polymerization in the secondary reactor 110 is effected in the following manner. First, 293 pounds of a 3.4% hydrogen peroxide solution in water is prepared in vessel 102 and 221 pounds of a reducing component consisting of a 4.9% sodium formaldehyde sulfoxylate and 0.59% sodium acetate in water is prepared in vessel 105. The oxidizing component is added at a rate of 35 gallons per hour and the reducing component at 26.5 gallons per hour, respectively, to secondary reactor 110. This rate provides a mole ratio of reducing agent to oxidizing agent of about 0.25:1 and about a 0.59% level of initiator to unreacted vinyl acetate.

The secondary reactor prior to start-up is filled with 38,000 pounds or to about 80% of capacity by volume with the same vinyl acetate-ethylene latex used as a heel in the primary reactor. The secondary reactor is maintained at 122° F. and the pressure is maintained at about 15 psig. During the post-polymerization, approximately 409 pounds ethylene, 52 pounds vinyl acetate, and 21 pounds water are lost through venting to the flare. Polymerization of the unreacted vinyl acetate in the latex is continued until the vinyl acetate content in the latex is 0.6% or less. It is anticipated about 7.9 pounds per hour of a conventional defoamer may have to be added during post-polymerization.

The fully reacted untreated emulsion is withdrawn from the secondary reactor at a rate of 1253 gallons or 11,282 pounds per hour, and has a polymer solids content of about 55.4%. This untreated emulsion is then sent to a conventional recovery unit and treated with approximately 339 pounds of an 18.5% formalin solution, 448 pounds of a 13% solution of tertiary butyl hydroperoxide in water and 318 pounds of a 12.7% solution of sodium acetate and 11.1% sodium nitrite in water. The finished product then is removed, filtered in a conventional manner and shipped to the storage tank.

The final specification for the latex is: 55–57% solids, a Brookfield viscosity (60 rpm) of 1,000–2,000 cps, a pH of 4.5–6.5, a distribution particle size from about 0.2 to 4.0 microns, a $T_g$ of 0°±2° C. and benzene insolubles of 50–70%.

EXAMPLE 2

Several continuous polymerization runs were made for the purpose of determining the effect alteration of certain process conditions would have on the end product. These runs were carried out in a primary reactor of approximately 15 gallons capacity having an inside diameter of about 20 inches, and a secondary reactor of about 150 gallon capacity operated at about one-third volume. Both reactors were equipped with highly efficient agitators. Table 1 below sets forth the run number and polymerization criteria to produce a finished product. Table 2 provides analysis of the physical properties of many of the latexes produced.

With regard to Table 1, the pressure is given with a range over the entire run, as in many cases, it was not held constant. The seed is given as a percent latex based on the total amount of vinyl acetate in the reaction mixture. The unreacted vinyl acetate content is given either as the mean percent over the entire run or as a specific sample value. The Tg listed is a specific sample value representative of the product obtained during the run, or in some cases an average or mean. In the case where $K_2S_2O_8$ was used as the oxidizer, it was added only to the primary reactor and $H_2O_2$ was added to the secondary reactor. Vinac 880 is a registered trademark of Air Products and Chemicals, and is used to identify a polyvinyl acetate homopolymer having a particle size of about 0.2 microns and 47% solids content. Airflex 500 is a registered trademark of Air Products and Chemicals, Inc., and is used to identify a vinyl acetate-ethylene emulsion having a solids content of 55% solids and an average particle size of 0.17 microns. Aerosol OT is a trademark of American Cyanamid Corporation and is used to identify sodium dioctyl succinate. Vinol 205 and Vinol 523 are trademarks of Air Products and Chemicals, Inc., and are used to identify polyvinyl alcohol compositions having a viscosity of 4–6 cps and 21–25 cps, respectively. The length run in hours primarily was dependent upon the degree of wall fouling (primarily in non-seeded cases) and for convenience in seed cases.

With respect to Table 2, the sample time is given at a particular time in the run when the process was lined out. Particle size distribution was determined by the use of a Joyce Loebel disc photosensitometer. The product was evaluated for consistency in particle size. The particle size is reported for the peak in the particle size curves. In those runs where a seed latex was not used, cycling occurred. By that it was meant the particle size distribution often was bimodal (two peaks) and the particle size would shift between bimodal and single peak distribution. In contrast, the seeded runs consistently produced a single peak distribution curve which was essentially duplicated throughout the run.

Peel strength is a measure of the adhesive quality in percentage versus a control vinyl acetate-ethylene emulsion produced by a batch technique. The control emulsion is one which has an extremely high peel strength, and we believe a product having at least 60% of the control peel strength would be suitable for many commercial applications.

TABLE 1

| Run | Primary Reactor Temp. °C./psig | Secondary Reactor Temp. °C./psig | Seed % VAC/type | Time (hrs) Primary/Secondary | Unreacted VAc, Mean %/$T_g$°C., | Catalyst Reducer | Protective Colloid | Length Continuous Run (hr.) |
|---|---|---|---|---|---|---|---|---|
| 1 | 55/250–350 | 30/10 | — | 3.65/5.8 | 5.0/5.0 | $H_2O_2$/SFS | 75/25 Vinol 205/523 | 56 |
| 2 | 55/250–270 | 28/10 | — | 4.53/7.2 | 5.2/8.8 | $H_2O_2$/SFS | " | 71 |
| 3 | 58/350–400 | 30/10 | — | 2.33/3.7 | 5.9/2.7 | $K_2S_2O_8$/SFS | 75/25–205/523 | 77 |
| 4 | 56/350–480 | 30/10 | — | 2.28/3.6 | 6.6/5.7 | $H_2O_2$/SFS | 75/25–205/523 + 0.11% Aerosol OT | 62 |
| 5 | 54.5/282–480 | 37/10 | — | 3.22/5.1 | 9.8/8.0 | " | 75/25–205/523 | 70 |
| 6 | 55/540–630 | 36/10 | — | 3.43/5.5 | 4.6/−11.1 | " | 100/0–205 | 70 |
| 7 | 55/510–576 | 38/10 | 4%/Vinac 880 | 3.0/4.9 | 4.9/−19.8 | " | 100/0–205 | 80 |
| 8 | 55/516 | 38/10 | 8%/Vinac 880 | 3.21/5.1 | 5.2/−11.4 | " | 75/25–205/325 | 72 |
| 9 | 55/480 | 26/10 | 8%/Vinac 880 | 3.47/5.5 | 10.1/4.3 | " | 75/25–205/523 | 78 |
| 10 | 50/680–700 | 55/10 | 8%/Airflex 500 | 3.5/7.0 | 13/0.5 | " | 75/25–205/523 | 115 |
| 12 | 50/492 | 55/<10 | 8%/Airflex 500 | 3.5/7.0 | 7.0/−1.0 | $H_2O_2$/SFS | 75/25-Vinol 205/523 | 105 |
| 13 | 50/680–700 | 50/<10 | " | " | 13.0/2.0 | " | " | 101 |
| 15 | 40/684–708 | 50/<10 | " | " | 18.0/0 | " | " | 101 |
| 16 | 50/492 | 25/<10 | " | " | 7.0/0 | " | " | 105 |
| 17 | 50/684 | 25/<10 | " | " | 13.0/−1.5 | " | " | 94 |
| 18 | 70/804 | 25/<10 | " | " | 13.0/−1.0 | " | " | 106 |

TABLE 2

| Run | Sample (hr.) | % Solids | 60 rpm Viscosity | Creep/mm/min. | Benzene Insol/% | Peak Particle Size (micron) | % Control Peel Strength |
|---|---|---|---|---|---|---|---|
| 1 | 56 | 55.4 | 672 | — | 75 | | 58.0 |
| 2 | 14 | 54.2 | 293 | — | 83 | | 42.0 |
| 3 | 77 | 54.4 | 606 | — | 74 | | 55.0 |
| 4 | 60 | 55.6 | 784 | — | 74 | | 50.0 |
| 5 | 47 | 53.2 | 3,070 | — | 64 | 2/Cycle 3.8/1.9 | 67.0 |

TABLE 2-continued

| Run | Sample (hr.) | % Solids | 60 rpm Viscosity | Creep/ mm/min. | Benzene Insol/% | Peak Particle Size (micron) | % Control Peel Strength |
| --- | --- | --- | --- | --- | --- | --- | --- |
| 6 | 54 | 56.0 | 400 | — | 84 | 2/Cycle 3.5/0.9 | 18.0 |
| 7 | 78 | 56.6 | 216 | — | 76 | (1.8) | 10.0 |
| 8 | 66 | 59.5 | 436 | — | 80 | (2.0) | — |
| 9 | 66 | 54.3 | 371 | — | 61 | (2.5) | 88 |
| 10 | 84 | 54.1 | 1,772 | 0.41 | 69 | (1.5) | 144 |
| 12 | 54 | 56.5 | 2,660 | 4.0 | 73.8 | 1.5 | 61 |
| 13 | 42 | 53.9 | 1,586 | 0.43 | 67.1 | 1.7 | 122 |
| 15 | 101 | 53.7 | 1,832 | 0.14 | 69.7 | 1.7 | 78 |
| 16 | 90 | 56.4 | 1,192 | 3.9 | 68.3 | 1.5 | 67 |
| 17 | 42 | 54.0 | 3,030 | 0.76 | 62.7 | 1.6 | 72 |
| 18 | 48 | 55.0 | 912 | 0.88 | 49.7 | 1.7 | 86 |

The results in Tables 1 and 2 show that poor peel strengths were recorded when the unreacted vinyl acetate monomer control in the primary reactor dropped below about 5%; and the best results were obtained at a level of about 13% unreacted vinyl acetate. The results also show that seeding is important for controlling the consistency of particle size during the run. Seeding is also important to reduce wall fouling as noted by short run times in non-seeded cases, visual observation, and by observing the differential between the polymerization temperature and required jacket temperature. It should also be noted that when the secondary polymerization was conducted at a higher temperature (45°–55° C.), greater peel strength was obtained.

Figure 3:
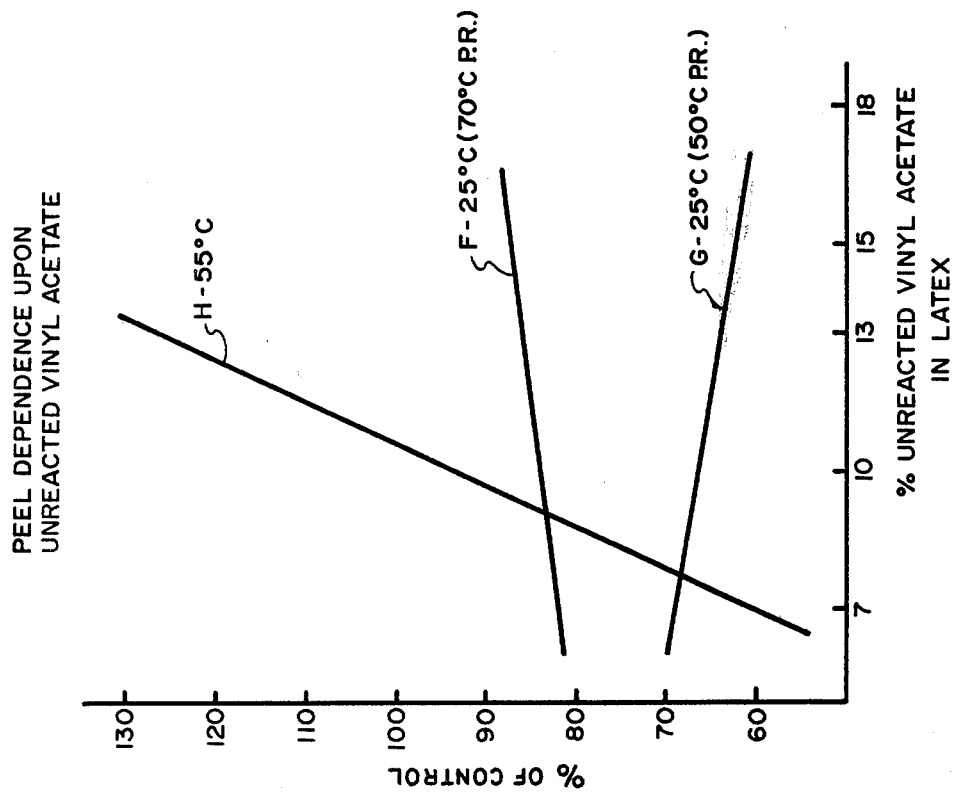
FIG. 3 is a graph of peel strength in percent of a control vinyl acetate-ethylene emulsion formed by a batch polymerization process verses the percent unreacted vinyl acetate in the latex from the initial polymerization zone prior to post-polymerization and as a function of the primary and post-polymerization temperature.

Based on data in Tables 1 and 2, and data accumulated from additional runs, FIG. 3 was prepared to show the influence of unreacted vinyl acetate monomer (abscissa) and post-polymerization temperatures on peel strength as a function of the peel strength of the control vinyl acetate-ethylene latex (ordinate). Basically, FIG. 3 shows that better adhesive strengths were obtained (lines F and H) as the unreacted vinyl acetate monomer level in the primary reactor was raised to about 12–16% and the secondary polymerization increased from 25°–55° C. Specifically, line F is the result of a 70° C. primary reactor temperature and a secondary reactor temperature of 25° C. and line H is the corporate of a 50°–70° C. primary reactor temperature, and 55° C. secondary reactor temperature. Line G is the result of a primary reactor temperature of 50° C. and a secondary reactor of 25° C., and it shows that peel strength can be increased simply by operating at higher temperatures in the primary reactor (compare line F). However, even though the minimum peel strengths were lower than the control, they are still suitable for commercial applications.

FIG. 4 was generated from the data in Table 2 and other representative runs made similarly to those in Example 2. It correlates creep rate as a function of percent unreacted vinyl acetate in the primary reactor and with primary and secondary reactor temperatures. (Creep is a measurement whereby two cotton cloths are laminated with the emulsion and rolled to effect complete impregnation. The cloth laminate then is dried and the creep rate is measured as the rate of delamination in millimeters per minute. Delamination is effected on a one-inch strip of the cotton cloth by hanging a 500 gram weight onto one edge of the laminate at a temperature of 170° F.).

Lines A and B are representative of primary reactor temperatures of 70° C. and secondary reactor temperatures of 55° and 25° C., respectively. Lines C, D and E are representative of primary reactor temperatures of 50° C. and secondary reactor temperatures of 25° C., 55° C. and 50° C., respectively. These results show that creep rate is reduced as the percent free monomer is increased. It also shows the affect of free monomer in terms of creep rate can be magnified by lowering the primary reactor temperature. Thus an arbitrary creep rate target of about 0.6 mm/min., which is believed desirable for most commercial applications can be achieved by operating with the 12–16% unreacted vinyl acetate content and 45°–55° C. secondary reactor temperature parameters.

What is claimed is:

1. In a continuous process for forming a latex comprising the steps of polymerizing a reaction mixture comprising vinyl acetate, ethylene, water, a free radical initiator, and a protective colloid under pressure to form a latex containing a copolymer consisting essentially of vinyl acetate, ethylene and 0–10% of other vinyl monomer, the improvement which comprises:
    (a) continuously charging said reaction mixture to a polymerization vessel;
    (b) conducting an initial polymerization of said reaction mixture in said polymerization vessel in the presence of a seed latex for a sufficient time and sufficient temperature to form a vinyl acetate ethylene copolymer, said copolymer having a glass transition temperature of from minus 20° C. to plus 10° C.; and
    (c) continuously removing latex formed in (b) from the polymerization vessel at a rate commensurate with that of step (a) when the unreacted vinyl acetate content by weight of the latex is from 5–20% of said latex formed in (b) and then effecting post-polymerization of the unreacted vinyl acetate in the removed latex at an ethylene pressure of not more than about 300 psia until the unreacted vinyl acetate in the removed latex is not more than 1% by weight.

2. The process of claim 1 wherein said seed latex is provided in a proportion to provide from about 2–8% solids by weight of the vinyl acetate in the reaction mixture.

3. The process of claim 2 wherein said seed latex has a particle size of from about 0.1–0.5 microns.

4. The process of claim 3 wherein the initial polymerization is carried out at a temperature of from 40°–75° C.

5. The process of claim 4 wherein the post-polymerization is carried out at a temperature of 25°–80° C.

6. The process of claim 3 wherein the latex is removed from the initial polymerization zone when the unreacted vinyl acetate is from about 12–16% by weight of the latex.

7. The process of claim 6 wherein the protective colloid is selected from the group consisting of polyvinyl alcohol and a cellulose ether.

8. The process of claim 6 or 7 wherein the post-polymerization is carried out at a temperature of from 45° C. to 55° C., and the residual vinyl acetate in the latex is reduced in the post-polymerization to less than 0.6% by weight.

9. The process of claim 6 wherein said post-polymerization is carried out at an ethylene pressure of not more than 30 psia.

10. The process of claim 3, 4, 5, or 9 wherein said seed latex is selected from the group consisting of polyvinyl acetate homopolymer, vinyl acetate-ethylene copolymer having a Tg of from −14° to 4° C., and a vinyl acetate-lower alkyl acrylate copolymer with the vinyl acetate being present in a proportion of at least 85% by weight and said seed latex having a particle size of from 0.15–0.25 microns.

11. The process of claim 9 wherein the free radical initiator is a redox catalyst which includes a reducing agent and an oxidizing agent, and the mole ratio of reducing agent to oxidizing agent is from about 0.5–1.5:1 in the initial polymerization zone, and 0.2–0.6:1 in the post-polymerization zone.

12. The process of claim 9 wherein the reaction mixture consists essentially of vinyl acetate, ethylene, water and free radical initiator.

* * * * *